Patented Dec. 12, 1922.

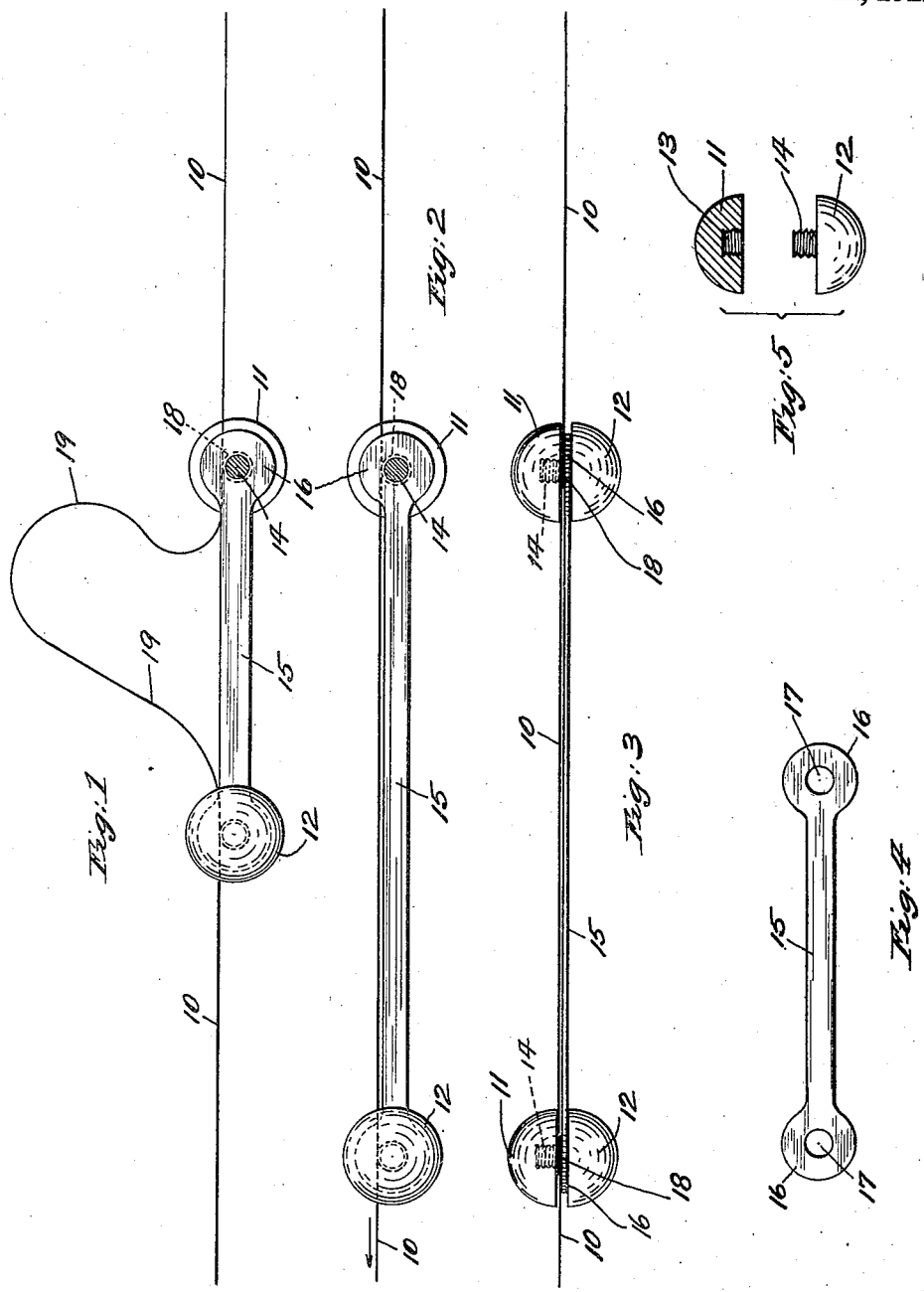

1,438,476

UNITED STATES PATENT OFFICE.

JOHN M. BLEY, SR., OF PHILADELPHIA, PENNSYLVANIA.

ATTACHMENT FOR FISHING LINES.

Application filed July 23, 1921. Serial No. 486,918.

*To all whom it may concern:*

Be it known that I, JOHN M. BLEY, SR., a citizen of the United States, residing at the city of Philadelphia, county of Philadelphia, and State of Pennsylvania, have invented a certain new and useful Attachment for Fishing Lines, of which the following is a specification.

This invention generally stated has relation to fishing lines and has more particular relation to fishing lines employed in deep-sea fishing.

In deep-sea fishing the general practice is to permit the line to rest over the index finger of the fisherman so that as fish "bite" an indication is given the fisherman to draw in his line. Frequently the fisherman "pulls in" too quickly with the result that a fish is not properly "hooked" or not "hooked" at all. This is particularly true in the case of an inexperienced fisherman.

The leading object of the present invention is to provide a novel form of device for attachment to a fishing line whereby the above objectionable feature may be eliminated and a fisherman, even of the inexperienced type, may be enabled to materially increase his "catch." Other and further objects reside in the provision of an arrangement, combination and connection of parts for attaining the result sought by said leading object.

The invention consists of the improvements hereinafter described and finally claimed.

The nature, characteristic features and scope of the invention will be more fully understood from the following description taken in connection with the accompanying drawings forming part hereof, and in which:

Fig. 1, is a fragmentary view in elevation of a fishing line equipped with a device embodying features of the invention, said line being illustrated in normal position.

Fig. 2, is a similar view illustrating the position of the line at the time of a "bite."

Fig. 3, is a top or plan view of Fig. 2.

Fig. 4, is a detail view of the elastic element shown in said figures, and

Fig. 5, is a view illustrating details of construction of the clamps.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

While the device about to be described is applicable to various kinds of fishing lines, it is particularly adapted for use upon deep-sea fishing lines and the following description, for illustrative purposes, is restricted thereto.

In the drawings 10 designates a line one end of which is adapted to have attached thereto a "lead" and a hook or hooks and the other end of which is either held by the fisherman or secured to a fixed object. Intermediate the ends of the line is interposed the device of the invention which generally stated comprises an elastic member and a pair of clamps. In the example shown in the drawings each clamp comprises two button-like members 11—12 of which member 11 is provided with a screw-threaded socket 13 and member 12 with a screw-threaded stem 14. These members may be of wood or other appropriate material. Connecting the two clamps is a member of elastic material, as rubber, consisting of an elongated, flat, strip 15 the ends of which each terminate in a disc-like portion 16 apertured as at 17. In practice the apertured disc-like portions of the elastic member are fitted over the stems 14 of buttons 12 and the line 10 caused to be coiled around each stem 14 as at 18 leaving a loop or "slack" portion 19 between the two clamps. Buttons 11 are now screwed to place to securely clamp the line 10 in this position ready for use. A fish in taking bait in its mouth pulls upon line 10 and causes the elastic member to stretch until the "slack" of loop 19 is taken up at which time a perceptible "pull" of the line causes the hook to properly engage the mouth of the fish thus in effect causing an automatic "catch." The "pull" above referred to is caused by the fact that one end of the line is fixed and the fish is "playing" the hook-end of the line.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing of its advantages.

What I claim is:

1. In combination, a pair of spaced clamps, an elastic member each end of which is firmly pressed between a clamp part and a fishing line also firmly pressed between each clamp part with a slack or loop-like portion arranged intermediate said clamps.

2. In a device of the character stated a pair of disc-like clamps and an elastic member provided with disc-like ends connecting said clamps.

3. In a device of the character stated a pair of clamps each comprising button-like members having screw-threaded engagement with one another, an elastic member each end of which is firmly pressed between a pair of said members and a fishing line also firmly pressed between each pair of members with a slack or loop-like portion arranged intermediate said pairs of members.

4. In a device of the character stated a pair of clamps each comprising button-like members of which one member has a screw threaded socket and the other a screw-threaded stem and an elastic member connecting the stems of said clamp members the ends of the elastic member being disc-like and apertured for passage over said stems.

5. In combination a fishing-line, spaced means clamped thereto said line having a slack or loop-like portion arranged intermediate said means and a thin flat elastic member connecting said means.

6. In combination a fishing-line, spaced means including disc-like members clamped thereto said line having a slack or loop-like portion arranged intermediate said means and an elastic member having disc-like ends connecting said means.

7. In combination a fishing-line, spaced means including disc-like members having screw-threaded engagement with one another clamped to said line which line has a slack or loop-like portion arranged intermediate said means and an elastic member connecting said means.

8. A construction as described in claim 7, characterized by screw-threaded sockets for one set of disc-like members, screw threaded stems for the other set of said members said elastic member being apertured for passage over the stems of said disc-like member.

9. A construction as described in claim 7, characterized by screw-threaded sockets for one set of disc-like members and screw threaded stems for the other set of said members said fishing line being coiled around the respective stems of said disc-like members.

10. In combination spaced clamping means, a fishing line having portions thereof looped around said means and clamped thereby said line further having a slack or loop-like portion arranged intermediate said clamping means and an elastic member connecting said means.

In testimony whereof, I have hereunto signed my name.

JOHN M. BLEY, Sr.